United States Patent [19]

Claypole

[11] 4,425,766
[45] Jan. 17, 1984

[54] MOTOR VEHICLE COOLING FAN POWER MANAGEMENT SYSTEM

[75] Inventor: George M. Claypole, Fenton, Mich.

[73] Assignee: General Motors Corporation, Detroit, Mich.

[21] Appl. No.: 378,996

[22] Filed: May 17, 1982

[51] Int. Cl.³ .......................... B60H 3/04; F01P 7/02
[52] U.S. Cl. .................................. 62/133; 123/41.12; 236/35
[58] Field of Search ...................... 62/133, 183, 323.1; 236/35; 123/41.12, 41.49

[56] References Cited

U.S. PATENT DOCUMENTS

| | | | |
|---|---|---|---|
| 2,452,007 | 10/1948 | Weybrew | 123/41.12 |
| 2,807,246 | 9/1957 | Jacobs | 123/41.12 |
| 3,052,175 | 9/1962 | Beltz | 98/2 |
| 3,061,277 | 10/1962 | Anderson | . |
| 4,179,888 | 12/1979 | Goscenski | 123/41.12 X |
| 4,313,402 | 2/1982 | Lehnhoff et al. | 123/41.12 |
| 4,378,760 | 4/1983 | Barge | 123/41.12 |

Primary Examiner—William E. Wayner
Attorney, Agent, or Firm—C. R. Meland

[57] ABSTRACT

A power control system for an electric motor driven cooling fan that directs air over the radiator and air conditioning condenser of a motor vehicle. The system includes a pulse width modulated voltage control device for controlling the voltage applied to the cooling fan motor from the vehicle engine driven generator. The voltage applied to the cooling fan motor can be controlled in response to engine coolant temperature, vehicle road speed, engine speed and the "on"/"off" state of the vehicle air conditioning system. A digital system that determines voltage pulse width in accordance with the above-mentioned variables is disclosed.

8 Claims, 8 Drawing Figures

MOTOR VEHICLE COOLING FAN POWER MANAGEMENT SYSTEM

This invention relates to a power management system for controlling the power applied to the electric motor driven radiator cooling fan of a motor vehicle where the electric motor, for driving the cooling fan, is powered from a vehicle electrical system that is supplied with power by an engine driven generator.

It is well known in the art to provide cooling for the radiator and air conditioning condenser of a motor vehicle by driving a cooling fan by an electric motor that is supplied with electric power from the engine driven generator. In systems of this type the generator is driven by the engine that propels the vehicle and the power generating capacity of the generator is a function of engine speed. At low engine speeds and particularly in an idle speed range, generator output power is low but it, in conjunction with the storage battery of the system, must supply all of the electrical loads on the motor vehicle that may, at that time, be energized including the electric motor that drives the cooling fan. Since the cooling fan motor consumes a relatively large amount of power, as compared to the total motor vehicle electrical load, it is important that this power be used judiciously, that is, that cooling fan motor power be conserved as much as possible but still be sufficient to cool the radiator and air conditioning condenser when the vehicle is equipped with an air conditioning system.

It accordingly is one of the objects of this invention to provide a power management system for the electric motor driven cooling fan which maintains the power consumed by the electric motor as low as possible within the limits of maintaining proper cooling for the radiator and air conditioning condenser when the vehicle is equipped with air conditioning. In accordance with one aspect of this invention this object is accomplished by controlling the power supplied to the cooling fan motor in accordance with engine speed such that at higher engine speeds, and therefore higher output of the engine driven generator, more power is permitted to be applied to the cooling fan motor. In the low idle speed range, the power supplied to the motor is reduced so as to reduce the load on the generator. This is accomplished by use of a digital computer comprising a microprocessor which has a memory containing data values relating engine speed to voltage to be applied to the motor. Under certain coolant temperature conditions of operation the data contained in the memory is utilized to control a pulse width modulator connected between the generator and motor to thereby control the voltage and hence power that can be supplied to the cooling fan motor in accordance with engine and generator speed.

In accordance with another aspect of this invention, where the vehicle is equipped with an air conditioning system including a condenser, the electric fan motor that cools both the radiator and condenser is controlled in accordance with engine coolant temperature, vehicle road speed and in response to whether or not the air conditioning system is "on" or "off". In order to conserve power the system is arranged such that when coolant temperature is below a predetermined value, vehicle road speed is above predetermined value and the air conditioning system "on", the system will completely deenergize the cooling fan motor. Under a condition of operation where engine coolant temperature is below the predetermined value, vehicle speed below the predetermined value and the air conditioning system is "on", the cooling fan motor is energized with a condenser cooling voltage magnitude that is lower than that required to cool the radiator at high speed and high temperature operation of the engine. This condenser cooling voltage magnitude is selected to be high enough to adequately cool the condenser and may have a fixed magnitude or can decrease with increasing vehicle road speed to provide additional power savings. With this arrangement a head pressure switch, which has been used to control the "on"/"off" operation of the cooling fan motor, can be eliminated.

In accordance with another aspect of this invention the power supplied to the cooling fan motor is controlled by a pulse width modulator in accordance with vehicle road speed, air conditioning "on"/"off" state and engine coolant temperature and further the system is arranged such that a memory containing values relating vehicle road speed and voltage pulse width to be applied to the motor is provided to control the pulse width modulator such that between zero vehicle road speed and some speed, for example of 35 miles per hour, the fan power is regulated and reduced as vehicle speed increases. In utilizing this system another memory, containing data values relating voltage pulse width to engine speed, can control fan motor applied voltage when coolant temperature increases to a value requiring radiator cooling.

Figure 1:
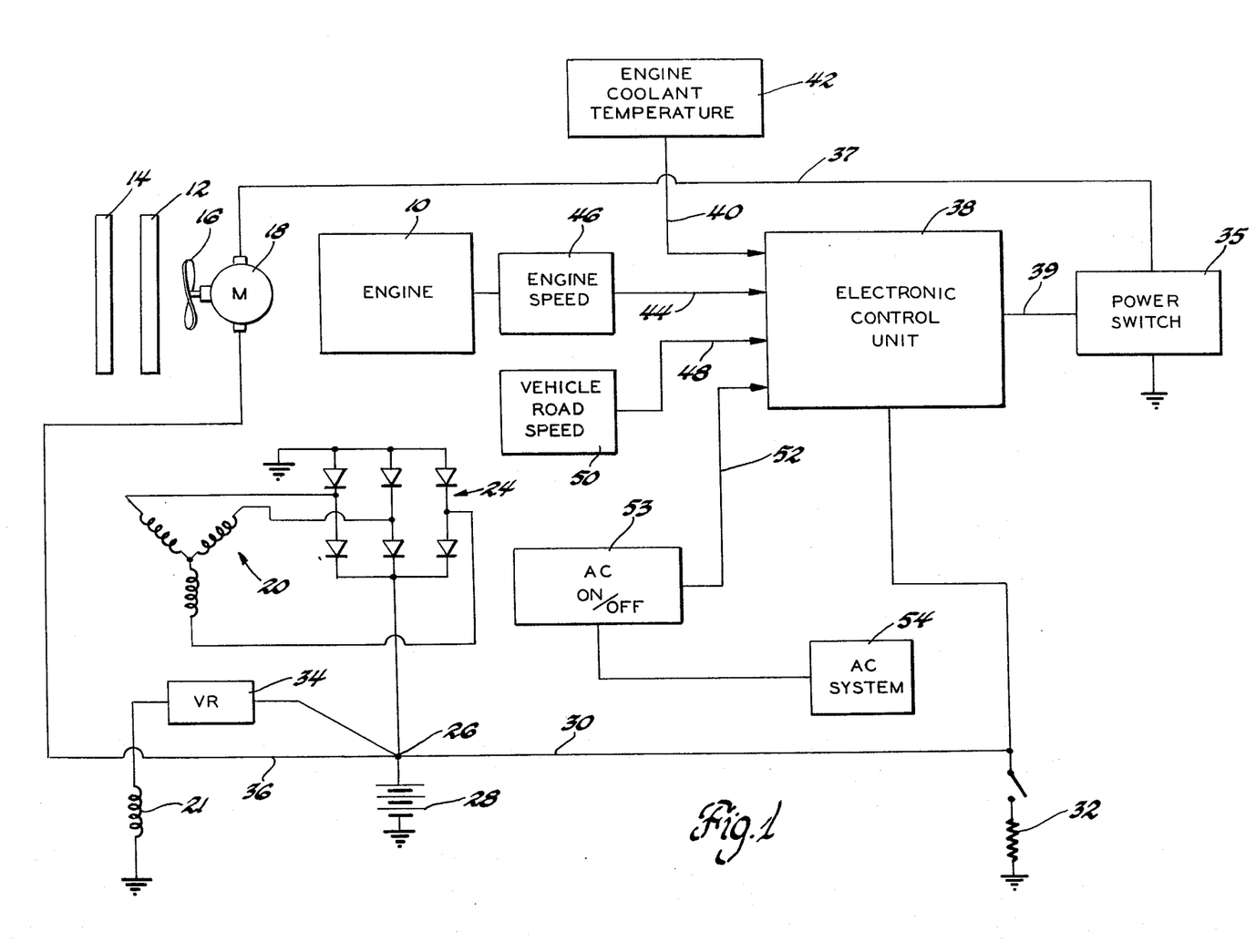
FIG. 1 is a schematic diagram of an electric motor driven cooling fan power management system made in accordance with this invention.

Referring now to the drawings and more particularly to FIG. 1, the reference numeral 10 designates an internal combustion engine for driving the wheels of a motor vehicle. The motor vehicle has a radiator designated by reference numeral 12 which is connected to the engine in a conventional manner by a coolant circulation system that is not illustrated. The radiator 12 is cooled by a fan 16 driven by a direct current permanent magnet electric motor 18. When the vehicle is equipped with an air conditioning system it includes a condenser 14 located in front of the radiator. In such a system the fan 16 causes cooling air to flow both through the radiator 12 and the condenser 14 when the electric motor 18 is energized. The electric motor, as mentioned, can be of the permanent magnet type having a permanent magnet field and a wound armature connected to a commutator that engages the usual brushes.

The engine 10 drives a diode-rectified alternating current generator generally designated by reference numeral 20. The generator has a rotor including a field winding 21 which can be belt driven by the engine 10. The generator has a three phase Y-connected stator winding electrically connected to a three phase full wave bridge rectifier designated by reference numeral 24. The positive terminal of the bridge rectifier is connected to junction 26 and the negative terminal is grounded. A battery 28 is connected between junction 26 and ground and to a power supply conductor 30 which can supply the various loads on the motor vehicle generally designated as 32. The output voltage of the generator is maintained substantially constant by a voltage regulator 34 connected to control field current to field winding 21 in a conventional manner known to those skilled in the art.

The direct current fan motor 18 has voltage applied thereto via a power circuit comprised of power switch 35 and conductors 36 and 37. One side of the power switch is grounded as illustrated. The power switch 35 preferably comprises one or more transistors which are switched "on" and "off" in accordance with a pulse width modulated constant frequency signal applied to it from an electronic control unit 38 via conductor 39. Thus, when the power switch 35 is turned "on" substantially full system voltage is applied to the direct current motor 18 and when the power switch 35 is turned "off" the motor is deenergized as is well known to those skilled in the art.

The pulse width or duty cycle of power switch 35 is controlled by an electronic control unit 38 which has a plurality of inputs which now will be described. One of the inputs is engine coolant temperature which is applied to the control unit 38 via conductor 40. This signal is developed by an engine coolant temperature sensor 42 of any conventional design, for example a thermistor placed in a position to sense engine coolant temperature. Another input to the control unit 38 is engine speed which is applied thereto by conductor 44. This signal is developed by an engine speed sensor 46 driven by engine 10. As an example, a magnetic pickup driven by the engine can supply pulses to the unit 38 which are a function of engine speed. Another input to the control unit is vehicle road speed which is applied thereto by conductor 48. Pulses applied to line 48 can be developed by vehicle road speed sensor 50 which again may be a magnetic pickup or other pulse generating device driven, for example by the speedometer cable of the motor vehicle. The control unit 38 further has an input from line 52 which depends on whether or not the air conditioning system on the vehicle is switched "on" or "off". This signal is developed by switch 53 and depends on the condition of the air conditioning switch that controls the "on"/"off" operation of air conditioning system 54.

Figure 2:
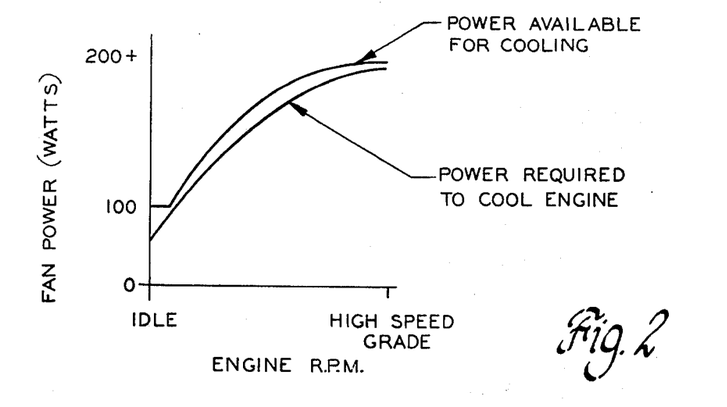
FIG. 2 illustrates curves generally indicating the power required for cooling a vehicle radiator and the power available for cooling by utilizing the system of this invention, both related to engine speed.

Referring now more particularly to FIG. 2, a pair of curves are illustrated relating fan power to engine speed. The upper curve, as labelled, is a curve of the power that the system of this invention makes available for cooling the radiator 12 and hence the engine and in cases where an air conditioning condenser is provided, for cooling the condenser. The lower curve illustrates the power that is necessary to cool the engine over a varying speed range. As illustrated by this curve, the fan power required to cool an engine is at its lowest value at engine idle and increases with engine speed. The upper curve is indicative of the amount of power that the system of this invention allocates to energize the fan motor 18 as a function of engine speed. This is a portion of the total power output of the generator 20. As an example, where the maximum power required by the fan motor is 225 watts and the maximum power output capability of the generator at high speed is approximately 100 watts, the maximum power allocated for the fan motor is approximately 0.225 the total power output capability of the generator. Both curves of FIG. 2 generally follow the current output-speed curve of a diode-rectified alternating current generator, that is, the generator develops its lowest output current in an idle speed range and has maximum output current at some high speed.

The control system, shown in FIG. 1, will now be described keeping in mind the power generating capability of the generator with speed and the curves of FIG. 2. The system of FIG. 1 is configured to provide adequate cooling for the radiator 12 and for the condenser 14 where the vehicle is equipped with an air conditioning system so as to minimize the power consumed by the fan motor 18. Considering first a vehicle that is equipped with both a radiator 12 and an air conditioning condenser 14, the system operates in a manner which will now be described. Assuming that the air conditioning switch 53 has been turned "on" and assuming further that engine coolant temperature is below some predetermined value, for example 110° C., the system can energize the fan motor 18 to cool the condenser 14. During this energization period fan motor power is reduced to its lowest level, for example 100 watts where the largest available power to the fan motor is 225 watts. Further, the fan motor is only energized when vehicle speed is between zero and approximately 35 miles per hour. Thus, at speeds in excess of 35 miles per hour the conductor 48 signals the electronic control unit 38 to completely deenergize the fan motor 18 whenever vehicle speed exceeds this value. In summary, with engine temperature below 110° C. and with the air conditioning system energized, the fan motor is energized at a relatively low voltage up to a vehicle road speed of approximately 35 miles per hour.

The motor 18 will be energized regardless of the "on"/"off" state of the air conditioning switch or vehicle road speed whenever the coolant temperature reaches 110° C. When this occurs, the electronic control unit 38 applies a square wave pulse to the power switch 35 at a constant frequency which switches the power switch "on" and "off". Further, the pulse width or duty cycle of this signal, and consequently the average voltage applied to the motor, is controlled as a function of engine speed such that motor input power generally follows the upper curve of FIG. 2 as engine speed increases. As an example, the duty cycle of the power switch 32 may vary from approximately a 67% duty cycle to a 100% duty cycle as a function of engine speed.

In the event coolant temperature exceeds still a higher value, for example 120° C., the system is arranged to apply a 100% duty cycle signal to the power switch 35 to thereby maintain the motor continuously energized at system voltage.

Figure 3:
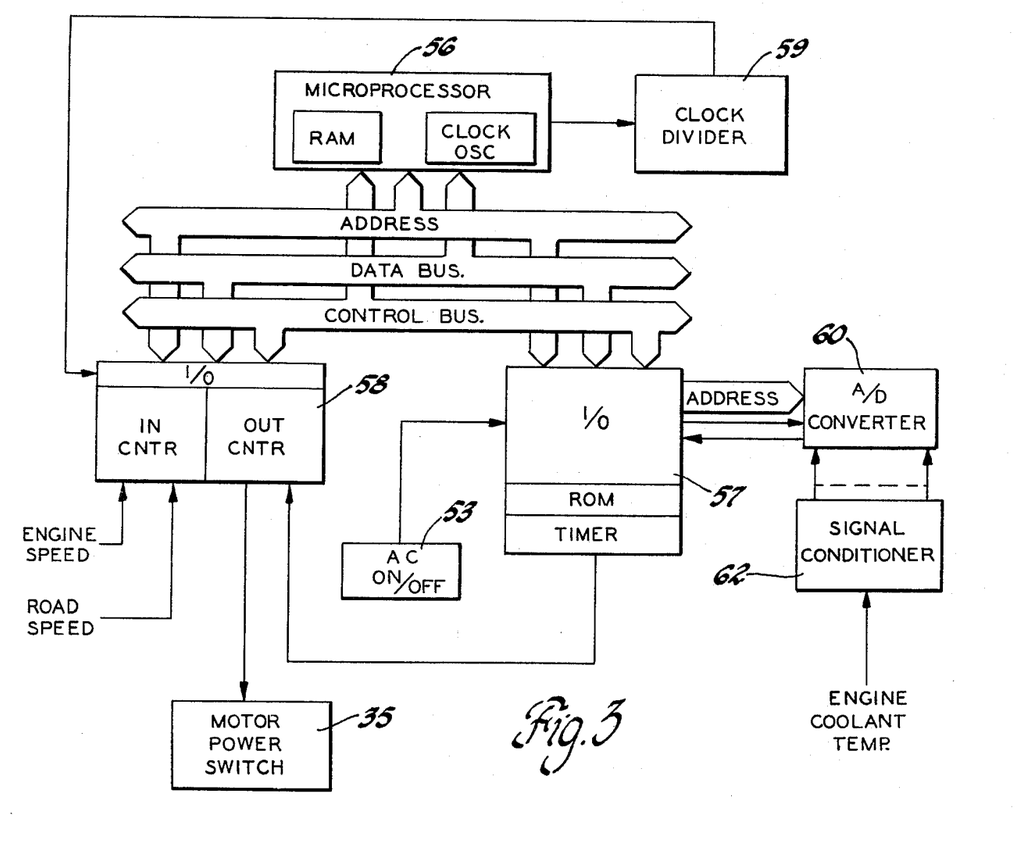
FIG. 3 illustrates digital control apparatus that forms a part of the system shown in FIG. 1.

The electronic control unit 38 takes the form of a digital computer system illustrated in FIG. 3. This system includes a microprocessor 56 containing a RAM and a clock oscillator. The system includes address, data and control busses as shown in FIG. 3, and input/output unit 57 which includes a ROM and a timer. The system further has an input/output interface circuit 58 coupled to clock divider 59 as shown. In addition, the system includes an A to D converter 60 and a signal conditioner 62. The circuit 58 has an input counter labelled as such, which has as inputs engine speed and vehicle road speed. The circuit 58 further has an output counter labelled as such, connected to the motor power switch 35. The digital computer system is more fully described in the U.S. patent to Kastura et al., U.S. Pat. No. 4,271,402.

The input/output device 57 is coupled to the AC "on"/"off" switch 53. Engine coolant temperature is sensed, for example, by a thermistor positioned to sense coolant temperature and this thermistor provides a direct voltage that is connected to signal conditioner 62 which in turn is connected to the A to D converter 60.

Figure 4:
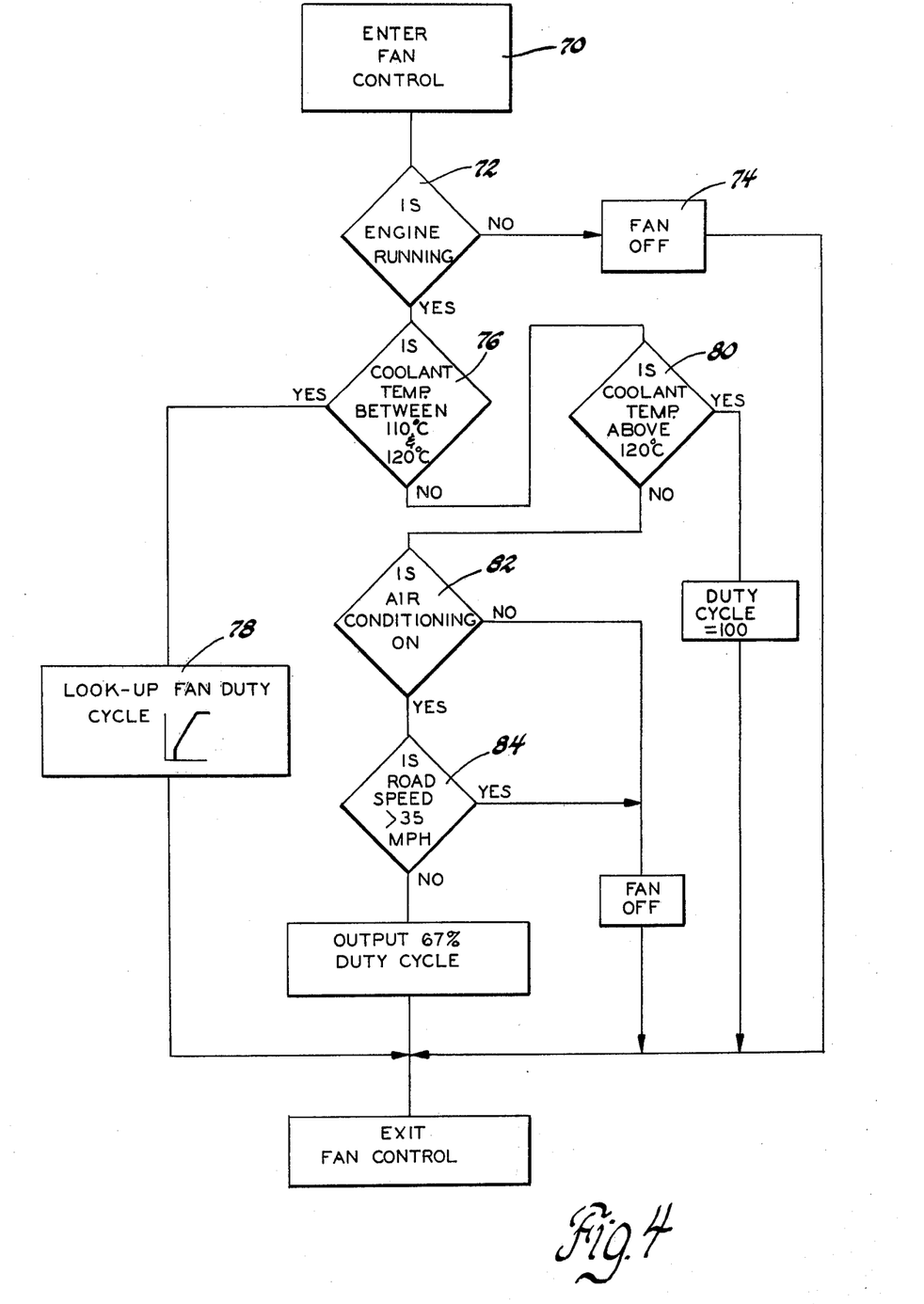
FIG. 4 is a flow diagram illustrating the control function of the digital system of this invention that controls power to the fan motor.
Figure 5:
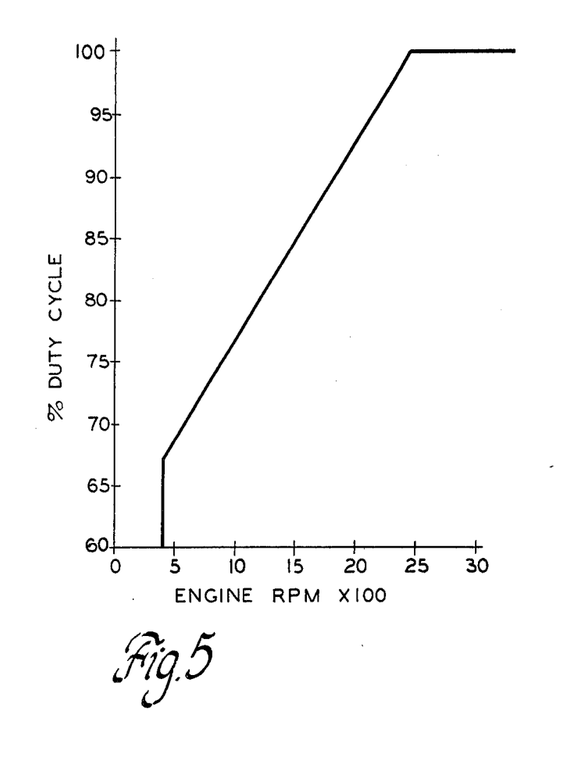
FIG. 5 is a curve of data values stored in a memory, utilized in the system of FIG. 1, relating engine speed to duty cycle of the voltage applied to the cooling fan motor.

The digital computer system shown in FIG. 3 is programmed to execute the flow diagram, shown in FIG. 4, which controls the system in a manner described above. As illustrated in FIG. 4, the system is initially energized by entering a fan control function as designated by block 70. In block 72 the system determines whether the engine is running and if it is not it maintains the fan deenergized as indicated by block 74. If the engine is running the program goes to block 76 where it is determined whether or not coolant temperature is between 110° C. and 120° C. If coolant temperature is within this range the system now regulates the duty cycle of the voltage applied to the motor in accordance with data values stored in the ROM of device 57 as indicated by block or step 78. FIG. 5 illustrates the data values that are stored in the ROM relating engine speed in rpm to percent duty cycle. Therefore, assuming coolant temperature to be between 110° C. and 120° C. the blocks 76 and 78 cause the pulse width of the voltage applied to the motor to follow the curve illustrated in FIG. 5 by retrieving the stored data values in the ROM of device 57.

The curve of FIG. 5 relates voltage pulse width to engine speed which translates into a power curve of motor power versus engine speed since motor input power is a function of applied voltage. The voltage pulse width curve of FIG. 5 produces a power input to motor 18 that generally follows the upper curve of FIG. 2.

If coolant temperature was below 110° C. the output of block 76 would indicate this. Engine coolant temperature is now checked in block or step 80 to determine if the coolant temperature is above 120° C. If coolant temperature is above 120° C. the duty cycle applied to the motor is 100% or in other words full system voltage is continuously applied to the motor.

If coolant temperature is not above 120° C. and also not in the range of 110° C. to 120° C. step 80 proceeds to block or step 82 to determine whether or not the air conditioning system is energized. If the air conditioning system is not energized the fan motor remains deenergized. If the air conditioning system was turned "on" the program goes to step 84 to determine vehicle road speed. If vehicle road speed is between zero and approximately 35 miles per hour, the output of block 64 commands a 67% duty cycle or approximately 100 watts. As soon as engine speed exceeds 35 miles per hour the block 84 turns "off" the fan motor as indicated by the flow diagram of FIG. 4.

Figure 6:
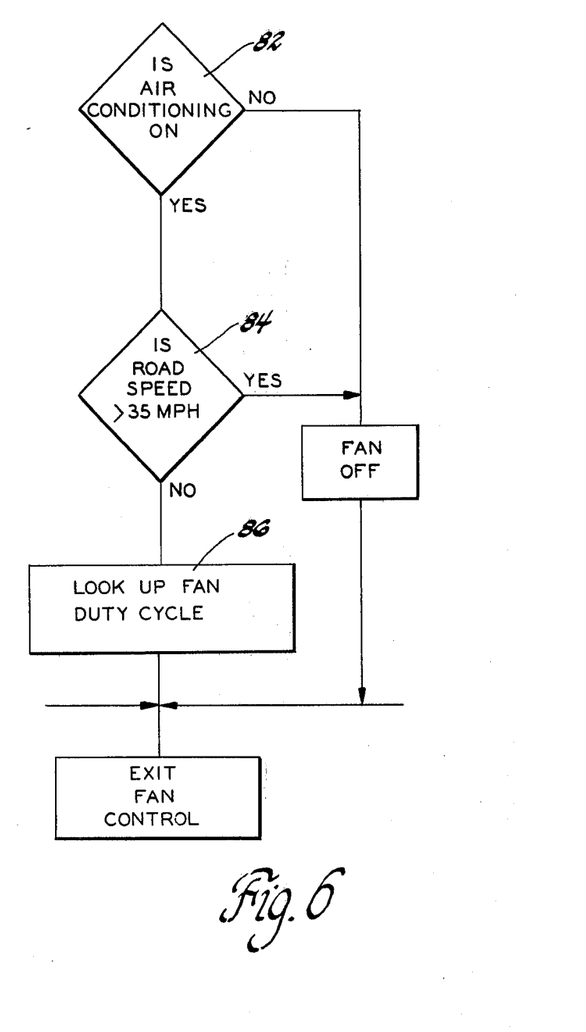
FIG. 6 illustrates a modified flow diagram that can be utilized to control fan motor voltage as a function of vehicle road speed.
Figure 7:
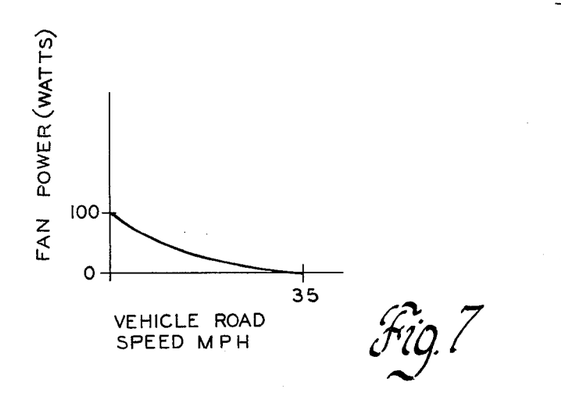
FIG. 7 is a curve of data values stored in a memory relating vehicle road speed and fan motor input power.

FIG. 6 illustrates a modification of the flow diagram shown in FIG. 4. In FIG. 6, only a portion of the flow diagram of FIG. 4 has been illustrated and a function has been added which controls the voltage to the motor as a function of vehicle road speed whenever the condenser 14 is being cooled by the fan motor and under conditions in which engine temperature is below 110° C. Thus, in FIG. 6 an added step or block 86 is utilized to control the voltage applied to the motor as a function of vehicle road speed. Thus, with the arrangement of FIG. 6, when road speed is below 35 miles per hour and when the air conditioner is turned "on" and further assuming a coolant temperature below 110° C. the voltage applied to the motor is controlled in accordance with the curve illustrated in FIG. 7 which relates vehicle road speed to power input to the fan cooling motor. As illustrated, at zero vehicle speed, the fan power is approximately 100 watts and decreases to zero input at a road speed of approximately 35 miles per hour. The curve of FIG. 7 is stored as data points in the ROM of device 57 in terms of voltage pulse width as related to vehicle road speed and is utilized to control motor voltage under the conditions specified above. Thus, applied voltage pulse width is selected to provide the power curve of FIG. 7. With this arrangement there is no need for an air conditioning head pressure switch which has been used in the past to control the energization and deenergization of the fan motor.

Figure 8:
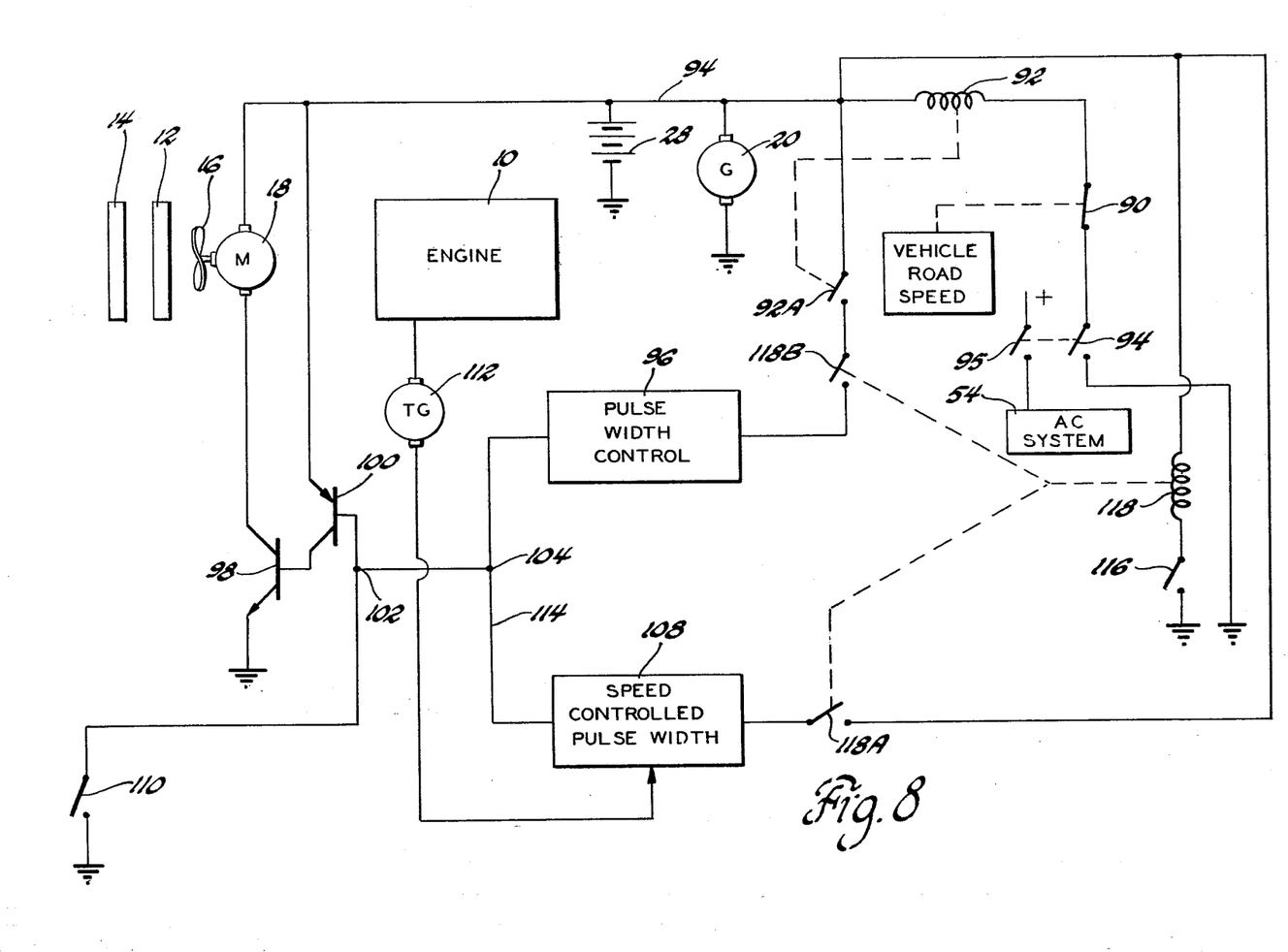
FIG. 8 illustrates a fan motor control system utilizing analog devices.

Referring now more particularly to FIG. 8, a fan motor control system is illustrated which performs the same function as the digital computer system of FIGS. 1 and 3 but which uses analog control devices. In FIG. 8 the same reference numerals have been utilized as were used in FIG. 1 to identify corresponding parts of these figures. In FIG. 8 the reference numeral 90 designates a switch which responds to vehicle road speed. This switch is closed at vehicle speeds below 35 miles per hour. The switch 90 is connected in series with a relay coil 92 which in turn is connected to the vehicle power supply conductor 94. The relay coil 92 controls a relay contact 92A which is normally open but which is closed whenever relay coil 92 is energized. The vehicle road speed responsive switch 90 is connected in series with a switch 94 which operates in conjunction with the air conditioning control switch 95 such that switch 94 is closed whenever the air conditioning system is energized and is open when the air conditioning system is switched "off". It therefore can be seen that relay coil 92 is energized when vehicle speed is below 35 miles per hour and the air conditioning status switch 94 is closed.

The relay controlled switch 92A controls the energization of a pulse width control designated by reference numeral 96. This pulse width control can take various forms and may, for example, comprise an astable multivibrator having a constant frequency, constant pulse width or duty cycle output. The constant pulse width output or duty cycle may be, for example, a 67% duty cycle corresponding to approximately 100 watts motor input power.

The output of the pulse width control device 96 is connected to a power switch comprised of an NPN transistor 98 that is connected in series with the fan motor 18. The switching of transistor 98 is controlled by a driver transistor 100 which is a PNP transistor having its collector connected to the base of transistor 98. It can be appreciated that whenever transistor 100 conducts, the transistor 98 is driven to a fully conductive condition and vice versa. The base of transistor 100 is connected to a junction 102 which is connected to junction 104. Junction 104 is connected to the output of pulse width control 96 by conductor 106. Junction 104 is further connected to the output of a speed controlled pulse width device designated by reference numeral 108. The junction 102 is also connected to one side of a bimetallic temperature responsive switch 110. This switch is positioned to sense engine coolant temperature and remains open until engine temperature reaches 120° C. whereupon the switch 110 closes. The opposite side of the switch 110 is grounded so that whenever the switch 110 is closed the transistor 100 is biased conductive to therefore bias transistor 98 fully conductive. This means that whenever coolant temperature exceeds 120° C. the motor 18 is continuously energized with full system voltage.

The speed control pulse width device 108 is coupled to a tachometer generator 112 which is driven by the engine 10. The tachometer generator develops a voltage which is a function of engine speed to thereby control the pulse width or duty cycle of constant frequency output pulses applied to conductor 114 from device 108. The device 108 can take the form of an oscillator having a constant frequency which develops output pulses of a variable duty cycle as a function of engine speed. Such systems are well known to those skilled in the art and one system of this type is disclosed in the U.S. patent to Sheheen U.S. Pat. No. 3,213,343. When the device 108 is energized it varies the pulse width of the signal applied to conductor 114 from approximately a 67% duty cycle to 100% duty cycle as a function of engine speed so that the conductive periods of transistor 98 varies from 67% (100 watts) to 100% (225 watts) duty cycle.

The system of FIG. 8 has another temperature responsive bimetallic switch 116 which is positioned to sense engine coolant temperature and which remains open until coolant temperature attains 110° C. This bimetallic switch is connected in series with relay coil 118 which controls relay contacts 118A and 118B. The relay contact 118B is a normally closed contact and is opened whenever bimetallic switch 116 closes to energize coil 118. The relay contact 118A is a normally open contact which is closed whenever switch 116 closes. It therefore will be appreciated that whenever engine coolant temperature is below 110° C. the relay contact 118A is open and the relay contact 118B is closed. Therefore, with engine coolant temperature below 110° C., and assuming relay contact 92A is open, the fan motor 18 is not energized via either the pulse width control 96 or the speed controlled pulse width device 108 and therefore remains deenergized. When engine coolant temperature reaches 110° C. to close bimetallic switch 116 the relay coil 118 is energized to close contact 118A and open contact 118B. The opening of contact 118B deenergizes circuit 96. As a result, the voltage applied to the motor is now controlled by the tachometer generator 112 and circuit 108 and the pulse width of this voltage can generally follow the curve illustrated in FIG. 5, that is, it increases with increasing engine speed. This control is effective regardless of the position of the air conditioning switch 94 and the vehicle road speed switch 90 since the opening of contact 118B disabled control by these switches.

When engine coolant temperature is below 110° C. the motor is deenergized, providing the air conditioning switch is in an "off" condition. Under this coolant temperature condition of operation, if the air conditioning switch is closed and vehicle road speed is below 35 miles per hour, the relay contact 92A will close to energize the pulse width control 96 and therefore provide a pulse width modulated voltage to motor 18 corresponding to a fixed 67% duty cycle or approximately 100 watts. This condition of operation will continue until coolant temperature reaches 110° C. whereupon coolant temperature controls the voltage applied to the motor as a function of engine speed.

In the event coolant temperature should exceed 120° C., the transistor 98 is continuously biased conductive to continuously apply full system voltage to the motor, as previously explained.

The various components illustrated in FIG. 8 can take forms other than those shown. Thus, the relays can be replaced by semiconductor switching devices if desired and the pulse width control 96 and speed controlled pulse width circuit 108 can be combined in one unit if so desired. Further, the tachometer generator function can be provided by sensing a speed responsive signal developed by the distributor of the engine as is well known to those skilled in the art. Thus, voltage pulses from the distributor, the frequency of which are a function of engine speed, can be converted to a direct voltage that varies with speed in a manner to those skilled in the art.

In regard to cooling fan motor control for cooling the air conditioning condenser the voltage applied to the cooling fan motor is kept as low as possible, consistent with adequate condenser cooling, and can decrease with increasing vehicle speed when controlled in accordance with the FIG. 7 curve. Thus, a system of this type conserves power as compared to a system that energizes the cooling fan motor when the air conditioning system is turned "on" with a voltage that is the same as that utilized when engine radiator cooling is required.

Where the vehicle is not equipped with air conditioning it, of course, does not have a condenser and the fan cools only the radiator. In such a system the flow diagram of FIG. 4 is modified to the extent of eliminating the control function regarding the air conditioning system. Thus, motor voltage is controlled in accordance with the curve of FIG. 5 when engine temperature is between 110° C. and 120° C. is completely deenergized when engine temperature is below 110° C. and is energized at full system voltage whenever engine temperature exceeds 120° C.

In the curve of FIG. 5, a 67% duty cycle is called for at an engine idle speed of 400 rpm. This corresponds to the lowest engine idle speed that will maintain the engine in a running condition. Thus, cooling fan power is always applied when the engine is running and engine coolant temperature is between 110° C. and 120° C. but at a level determined by engine speed.

In the foregoing description of the invention specific temperature values, engine and vehicle speed, power levels and pulse widths have been set forth. It is to be understood that these values can be varied to suit the vehicle cooling requirement and the power generating characteristic of the generator that is used in the system.

As previously described, the digital system of FIG. 3 includes a ROM located in input/output unit 57. This ROM has certain addressable memory locations which contain or store the data points that define the curve of FIG. 5. Further, this ROM has other addressable memory locations which contain data points generally defining the curve of FIG. 7. The various memory locations are addressed and the data contained therein retrieved to control motor voltage duty cycle in accordance with the flow diagrams of FIGS. 4 and 6.

In the flow diagram of FIGS. 4 and 6 certain conditions require that the fan motor be turned "off". This can be accomplished by, in effect, loading a zero into the output counter of circuit 58 when the motor is to be deenergized which corresponds to zero pulse width to the motor.

In regard to the modified flow diagram of FIG. 6, the block 84 can be eliminated if it were desired to control the motor duty cycle solely by the data values of FIG. 7 since the data stored, in accordance with FIG. 7, deenergizes the fan motor when vehicle road speed attains 35 mph.

One advantage of the digital system shown in FIGS. 1 and 3 is the fact that certain motor vehicles are already equipped with a digital computer system that controls, among other things, engine spark timing and fuel supply. This existing computer can be arranged to accommodate the additional fan motor control function of this invention. The ROM data can be selected to accommodate the fan cooling requirement of a particular vehicle as well as the generator output characteristic of the generator selected for use on the vehicle.

The air conditioning system 54 has not been described in detail since it is conventional and includes the usual engine driven compressor connected to an evaporator and the condenser 14 in the usual manner. The system does not require a head pressure switch for controlling energization of the fan motor 18 since the condenser is sufficiently cooled by energization of the fan motor in a manner that has been described.

As previously mentioned, circuit 96 can take various forms known to those skilled in the art such as a free-running or astable multivibrator having a constant frequency, constant duty cycle output. In this regard, this circuit can also be of a type disclosed in the above-referenced Sheheen U.S. Pat. No. 3,213,343. Both circuits 96 and 108 are arranged such that the output of these circuits periodically biases transistor 100 conductive to provide the corresponding desired duty cycle period of energization of motor 18.

The lowering of the voltage applied to the fan motor, for condenser cooling from a voltage level that is used when engine coolant temperature calls for radiator cooling, is useful regardless of whether this voltage level is a fixed value or varies with engine speed. In either case a power savings is achieved.

The embodiments of the invention in which an exclusive property or privilege is claimed are defined as follows:

1. A power control system for controlling the voltage applied to an electric motor that drives a cooling fan operative to direct cooling air over a vehicle mounted radiator and the air conditioning condenser of a vehicle air conditioning system comprising, a source of voltage, voltage control means connected between said voltage source and said motor for controlling the voltage applied to said motor, said voltage control means capable of varying the voltage applied to the motor between at least a first low value and a second higher value, means responsive to engine coolant temperature for causing said voltage control means to energize said motor at said second higher voltage value when engine coolant temperature exceeds a predetermined value, and means responsive to an energized condition of the air conditioning system, to vehicle road speed below a predetermined value and to engine coolant temperature below a predetermined value for causing said voltage control means to energize said motor at said first low voltage value.

2. In combination, a motor vehicle having an engine connected to a coolant radiator and an air conditioning system including a condenser, a cooling fan for directing cooling air over said radiator and condenser, an electric fan motor connected to said cooling fan for driving the fan, a source of voltage, pulse width voltage control means including power switching means connected between said voltage source and motor for controlling the voltage applied to the motor, means for detecting engine coolant temperature, means for detecting the "on"/"off" state of the vehicle air conditioning system, means responsive to coolant temperature coupled to said voltage control means for causing energization of the fan motor with a first voltage magnitude when coolant temperature attains a predetermined value, and means including said voltage control means for controlling the energization of the fan motor and the voltage applied thereto for cooling said condenser when engine coolant temperature is below a predetermined value, said last-named means responsive to a "on" condition of said air conditioning system and to vehicle road speed below a predetermined value for controlling said voltage control means such that said fan motor is energized with a condenser cooling voltage magnitude that is less than said first voltage magnitude.

3. A power control system for controlling the voltage applied to an electric motor that drives a cooling fan operative to direct cooling air over a vehicle mounted radiator and the air conditioning condenser of a vehicle air conditioning system comprising, a source of voltge, pulse width voltage control means connected between said voltage source and said motor for controlling the voltage applied to said motor, said voltage control means capable of varying the voltage applied to the motor between a condenser cooling voltage value and a second higher value, means responsive to engine coolant temperature for causing said voltage control means to energize said motor at said second higher voltage value when engine coolant temperature exceeds a predetermined value, means responsive to an energized condition of the air conditioning system, to vehicle road speed below a predetermined value and to engine coolant temperature below a predetermined value for causing said voltage control means to energize said motor with said condenser cooling voltage value, and means for causing said condenser cooling voltage value to decrease with increasing vehicle road speed.

4. In combination, a motor vehicle having an engine, a coolant radiator connected to said engine, an air conditioning system including a condenser, a cooling fan for applying cooling air to said radiator and condenser, an electric motor for driving said cooling fan, a generator driven by said engine for energizing said motor, a first memory containing data values relating engine speed to a voltage magnitude to be applied to the motor, a second memory containing data values relating vehicle road speed and a voltage magnitude to be applied to said motor, the voltage magnitude decreasing with increasing vehicle road speed, means responsive to engine coolant temperature and engine speed for controlling the voltage applied to said motor as a function of the data contained in said first memory when engine coolant temperature is within a predetermined range, and means for controlling the voltage applied to said motor in accordance with the data contained in said second memory when the air conditioning system is energized and coolant temperature is below a predetermined value.

5. In combination, a motor vehicle having an engine, a coolant radiator connected to said engine, an air conditioning system including a condenser, a cooling fan for applying cooling air to said radiator and condenser, an electric motor for driving said cooling fan, a generator driven by said engine for energizing said motor, variable pulse width voltage control means connected between said generator and motor for controlling the voltage applied to said motor, a first memory containing data values relating engine speed to voltage pulse width to be applied to said motor, a second memory containing data values relating vehicle road speed to voltage pulse width to be applied to said motor, the voltage pulse width in said second memory decreasing with increasing vehicle road speed, means responsive to engine coolant temperature and engine speed for controlling said voltage control means as a function of the data contained in said first memory when engine coolant temperature is within a predetermined range, and means for controlling said voltage control means in accordance with the data contained in said second memory when the air conditioning system is energized and coolant temperature is below a predetermined value.

6. In combination, a motor vehicle having an engine for propelling the same and a coolant radiator connected to the engine, a generator driven by said engine for supplying the electrical loads on the vehicle, a cooling fan driven by an electric motor for applying cooling air to the radiator, variable duty cycle voltage control means connected between said generator and said motor for controlling the voltage applied to said motor, memory means containing data relating the duty cycle of the voltage control means to engine speed, the duty cycle increasing with increasing engine speed over a speed range between a low engine idle speed and a higher speed and selected such that fan input power output is regulated to adequately cool the radiator over said speed range and further being selected so as to generally follow the speed current output curve of the generator, and means responsive to engine temperature attaining a predetermined value and to engine speed for causing variable duty cycle operation of said voltage control means in accordance with the duty cycle engine speed related data contained in said memory means.

7. In combination, a motor vehicle having an engine, a coolant radiator connected to said engine, an air conditioning system including a condenser, a cooling fan for applying cooling air to said radiator and condenser, an electric motor for driving said cooling fan, a generator driven by said engine for energizing said motor, voltage control means connected between said generator and motor responsive to engine speed and coolant temperature for varying the voltage applied to the motor between at least a first value and a second higher value as a function of engine speed when coolant temperature is within a predetermined range, and means for causing said voltage control means to apply a voltage to said motor that is less than said second higher value when coolant temperature is below a predetermined value, vehicle road speed is below a predetermined value and the air conditioning system is energized.

8. In combination, a motor vehicle having an engine, a coolant radiator connected to said engine, an air conditioning system including a condenser, a cooling fan for applying cooling air to said radiator and condenser, an electric motor for driving said cooling fan, a vehicle electrical system including power supply conductors connected to a generator driven by said engine, a switching means, means connecting said switching means and said motor in series across said power supply conductors, means responsive to engine coolant temperature attaining a predetermined value for operating said switching means to a continuous conductive state, means for at times causing said switching means to operate in a constant frequency constant duty cycle mode to lower the voltage applied to the motor, and means for setting said last-named means into operation when engine coolant temperature is below a predetermined value, the air conditioning system is energized and vehicle road speed is below a predetermined value.

* * * * *